United States Patent [19]
Cheng

[11] Patent Number: 4,728,831
[45] Date of Patent: Mar. 1, 1988

[54] DAMPED VOICE COIL ACTUATOR

[75] Inventor: Chun-Jer Cheng, Cuppertino, Calif.

[73] Assignee: Magnetic Peripherals Inc., Minneapolis, Minn.

[21] Appl. No.: 840,486

[22] Filed: Mar. 14, 1986

Related U.S. Application Data

[63] Continuation of Ser. No. 648,102, Sep. 7, 1984, abandoned.

[51] Int. Cl.⁴ .............................................. H02K 41/00
[52] U.S. Cl. ........................................ 310/13; 310/27
[58] Field of Search ...................... 310/12, 13, 14, 27

[56] References Cited

U.S. PATENT DOCUMENTS

| | | | |
|---|---|---|---|
| 2,810,842 | 10/1957 | Lewis | 310/27 |
| 3,527,969 | 9/1970 | Papst | 310/51 |
| 4,144,466 | 3/1979 | Hatch | 310/13 |
| 4,267,731 | 5/1981 | Jacobson . | |
| 4,408,283 | 10/1983 | Hearn . | |

OTHER PUBLICATIONS

Ahid D. Nashif, "Control of Noise and Vibration with Damping Materials," Jul., 1983, Sound and Vibration, pp. 28–36.

Product Information Circular, Structural Products Department/3M, "Scotchdamp".

Primary Examiner—Donovan F. Duggan
Attorney, Agent, or Firm—J. A. Genovese; M. B. Atlass

[57] ABSTRACT

This invention provides a structure for damping longitudinal vibrations in an apparatus which moves longitudinally.

It employs, in a longitudinally moveable body, a structural element, slotted in the longitudinal direction, so that said structural element has relatively rigid upper and lower portions and relatively flexible flextures at the slot ends. A layer of elastomeric material covers a side of said element and a stiffening plate covers said elastomeric layer.

3 Claims, 6 Drawing Figures

DAMPED VOICE COIL ACTUATOR

This is a continuation of co-pending application Ser. No. 06/648,102 filed on Sept. 7, 1984, now abandoned.

FIELD OF THE INVENTION

This invention relates to damping or attenuating unwanted vibration and noise produced by the movement of a voice coil actuator.

BACKGROUND OF THE INVENTION

To read and write magnetic disk files, transducing heads are mounted on a series of parallel arms which are in turn connected to a tower for holding them, which in turn is connected to a rail or carriage structure the opposite end of which carriage structure is connected to a voice coil. This entire actuator assembly is movable in response to the energization of the voice coil in a voice coil motor. Connecting the voice coil directly to the actuator assembly results in longitudinal resonances and vibrations which do not allow for accurate location of the transducing heads above tracks on the disk media.

It is understood by those skilled in the relevant art that damping is but one of numerous methods to be employed for solving such noise and vibration problems. See for example: "Control of Noise and Vibration with Damping Materials," Ahis D. Nashif, *Sound and Vibration*, July, 1983.

Vibrations occurring in ranges over about 500 hz were considered filterable because in the past they were out of the signal range but as actuators were needed to operate in that range, the prior arts teachings of shifting the frequency of vibration upward were useless, thus a method of damping had to be found.

One method of damping vibration in a plane parallel to the disk recording surface has been taught by U.S. Pat. No. 4,408,283. In that patent, a pair of sidebars were attached by a thin strip of elastomeric adhesive to an arm of the transducing head supporting structure.

U.S. Pat. No. 4,144,466 describes a damping means for use in a voice coil-type linear actuator. In that patent, an elastomeric layer is arranged concentrically between two cylindrical rings. In that patent, auxiliary stiffening means are also required, in the form of beams and slots perpendicular to the longitudinal motion of the actuator.

In U.S. Pat. No. 4,144,466, attempts were made to apply unconstrained and constrained damping layers to the carriage or the coil itself without success (Lines 27 to 37).

The invention taught by the instant application however, provides for just such an arrangement. None of the prior art suggests the use of fins slotted with "H" shapes as described herein, nor their use in conjunction with applied layers of elastomeric material and stiffening plates to dampen the longitudinal resonances and other noise of voice coil actuators, as is taught here. The concept of slots allowing relative motion and application of this to damping in the form presented herein is a completely new idea.

SUMMARY OF THE INVENTION

Accordingly, the primary object of this invention is to provide an improved voice coil-type actuator for accessing disk files or the like.

Another object of this invention is to provide for efficient damping of vibrations in the direction of coil movements in a voice coil actuator assembly.

Yet another object of this invention is to provide for a new damping structure.

Toward these ends, according to this invention, a plurality of fins are firmly attached to the inside of a coil, and disposed centrally. A fin is provided with a substantially "H" shaped slot to weaken the link between the upper part and the lower part of the fin, thus allowing opposing motion to develop on each side of the slot, concentrating the shear deformation in the flextures created by the slot. Each side of the slotted fin is covered with a sheet of elastomeric material, said elastomeric material in turn being covered with an attached stiffening plate. Opposing movement of the upper and lower parts of the fin in the plane of the fin creates shear deformation of the elastomer which absorbs vibration caused by movement of the fins.

The foregoing and other objects, features and advantages of this invention will become apparent from the following, more detailed description of a preferred embodiment hereof, as illustrated in the accompanying drawings.

DESCRIPTION OF PREFERRED EMBODIMENTS

Figure 1:
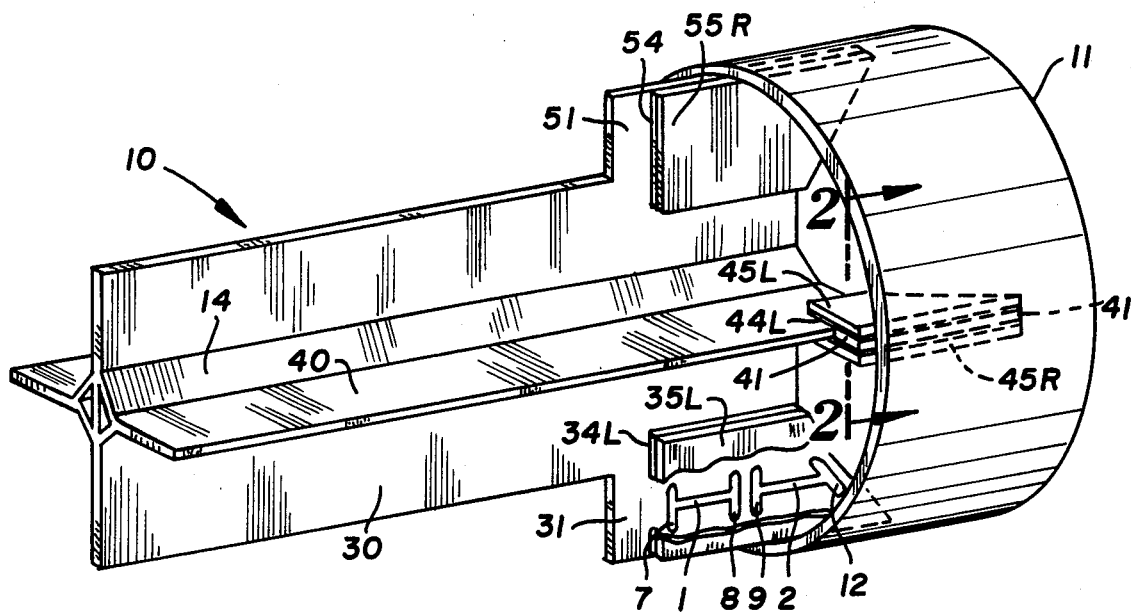
FIG. 1 is a perspective view of the relevant portion of the voice coil fin rail assembly. A cut-away in the lower fin is provided in this view to illustrate the position of the double slots in the longer fins.
Figure 2:
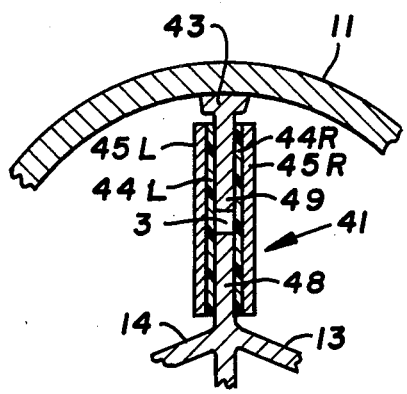
FIG. 2 is a cross-sectional view of fin 41 taken at line 22 of FIG. 1.
Figure 3:
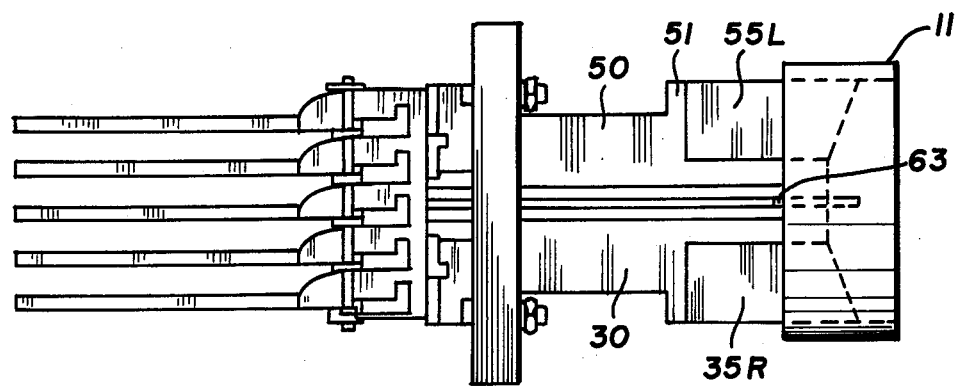
FIG. 3 is a side view of the entire actuator assembly.

In the preferred embodiments, the entire set of rails and fins is one molded piece. The voice coil 11 of FIG. 1 is solidly connected to each of the four fins, fin 31, fin 41, fin 51, and fin 61 (not shown). Each fin has a widened edge for this connection depicted as fin edge 43, in FIG. 2. Each fin is joined centrally by its rail, rail 30, rail 40, rail 50, and rail 60, respectively; said rails being centrally joined to each other by four raised joint plates 13 through 16 (plate 14 is shown in FIG. 1). The structure formed or constructed in this way between the fins allows for the use of a central support core (not shown) and for guiding means (also not shown), which guiding means and central support core may be used to ensure that the voice coil actuator assembly does not deviate from its axis during longitudinal movement. (A central support core is used as a guide only in some cases, the more common construction fits or suspends the voice coil actuator assembly in a guide means without a central support as illustrated by FIG. 3. The design employed for maintaining the assembly centered on its axis is not essential or relevant to this invention.

As illustrated in FIG. 1, a layer of elastomeric material, for example, elastomeric layer 34L, is applied directly to a fin, for example, fin 31, and a stiffening plate, for example, stiffening plate 35L, overlays this elastomeric layer 34L. (In practice the elastomer is a double backed tape and is applied to the stiffener plate first which assembly is then applied to the fin.) This elastomeric layer 34L and stiffening plate 35L are cut-away in FIG. 1 to reveal the configuration of slots 1 and 2 in fin 31. Fin 41 and fin 61 have single slots as shown in detail in FIG. 4. The slots of fin 51 are similar to the slots 1 and 2 of fin 39.

Figure 4:
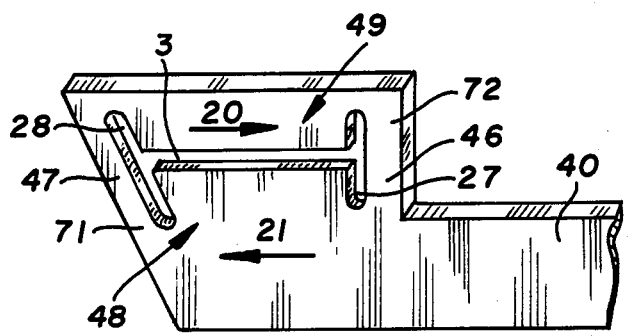
FIG. 4 is a side view of the rail and fin structure sans the elastomeric and stiffening plate covering.

Referring now to FIG. 4, slot 3 is shown to extend substantially the length of fin 41. At each end of slot 3 are enlarged end 27 and enlarged end 28, enlarged end 28 having an enlargement parallel to the back of fin 41, rather than perpendicular to slot 3, said parallel construction used to prevent the back of the fin 41 from having a weaker flexture member 71 at back 47 than that the flexture member 72 at front 46. When coil 11 is energized within a pair of permanent magnets, as is often the case in use of a voice coil actuator, a force is applied to fin 41 via its firm connection at fin edge 43, say, in the direction of arrow 20. Because of the nature of slot 3, the inertia, or opposing momentum, of the lower half of fin 41, rail 40, and all attached structures, is allowed to develop in the direction of arrow 21. A slot without enlarged ends 27 and 28 does not permit the same degree of opposing motion to occur. Without such enlargements the volume of deformable material would be much smaller at back 47 and front 46, thus allowing less freedom of motion between upper portion 49 and lower portion 48 due to what would then be very short or reduced length flextures. By allowing this motion of shear and bending deformation in the flextures to occur, the energy of vibration is directed into and absorbed by the resultant shear deformation in the elastomer layer held by the stiffener.

The resultant shear deformation occurs as the stiffening plate forbids or restricts movement of the attached elastomer on one side while the opposing movement of upper portion 49 and lower portion 48 imparts motion to the other side.

Figure 5:
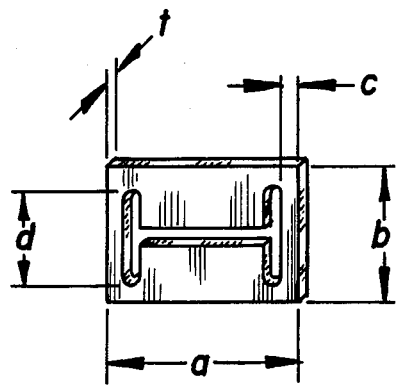
FIGS. 5 and 6 are side views of an idealized fin structure.

For purposes of explanation only, vibrational damping may be achieved in any similar structural geometry governed by the formula which follows:

$$\text{Ratio} = (a/b) \times (d/c)^3 \qquad 1,$$

where a=total fin length, b=fin height, d=height of the flexture (or enlargement) and c=the flexture thickness (width); and where Ratio=10, the equation is satisfied for practical purposes. FIG. 5 describes the application of this formula to an idealized structure of the appropriate geometry. The concept the formula is intended to achieve is to have the upper and lower portions behave like rigid bodies when compared to the behavior of the flextures.

It is to be understood that a fin structure preferably has a thickness (t) of the same order of magnitude as the stiffener plate but that due to size constraints in the placement of a voice coil assembly, the stiffener plates have been around 60% the thickness of the fin.

The width e of the slot enlargement should be as narrow as possible as should the width c of the flextures but cost and manufacturability considerations will limit this. Reducing e's width grants more area to the elastomer covering it for purposes of shear deformation and thus increases the damping effect as e's width decreases.

Figure 6:
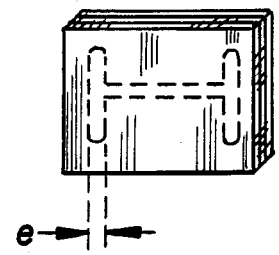

It is preferred that an area generally defined as in FIG. 5 by a height b and width a be covered by the elastomeric layer and stiffening plate as in FIG. 6.

Any arrangement of slots which are in the direction of the longitudinal motion which follows the general principles of construction set forth herein would provide potential damping benefits.

The longer fins 51 and 31 are provided with, for example, paired slots 1 and 2, each slot with its own enlarged ends 7 and 8 on slot 1 and 9 and 12 on slot 2. Two slots were used here instead of one long slot to prevent possible fin warpping which the introduction of one long slot is likely to produce. For damping purposes, one slot would work as well.

The particular elastomeric material employed in the preferred embodiment is a visco-elastic polymer double-sided adhesive tape know by the registered trademark Scotchdamp, a 3M Company trade product. The particular Scotchdamp used varies with the temperature as is understood by those skilled in using the Scotchdamp product. It is typically a thickness of 1 mil while the fins are typically 65 mil thick and the stiffener plates are 40 ml thick in the voice coil actuator embodiment. It should be understood that while this configuration of voice coil actuator assembly is especially desirable to provide finely controlled movement of a voice coil actuator assembly relative to the closely-spaced tracks on a disk file, it may also be used in other applications requiring effective damping and accurate longitudinal positioning of a similar actuator, or of any similarly finned, longitudinally motive structure.

While the invention has been particularly shown and described with reference to a preferred embodiment, it will be understood by those skilled in the art that various changes in form and detail may be made herein without departing from the spirit, scope and teaching of the invention. Accordingly, the apparatus herein disclosed is to be considered merely as illustrative, and the invention is to be limited only as specified by the following claims.

I claim:

1. In a longitudinally movable body, at least one fin of unitary construction, with two sides, a front, and a back, in which said fin is substantially divided by a slot disposed longitudinally between said front and said back, said slot having enlarged ends, such that said slot forms the crosspiece and said ends form the uprights of a substantially "H" shaped hole through said fin and in which fin said slot substantially divides said fin into relatively immovable upper and lower portions and relatively movable front and back flextures wherein:

an area of said fin, greater in size than said "H" shaped lot, is substantially covered by a layer of elastomeric material affixed to at least one of said fin sides, and wherein said elastomeric layer is substantially covered by stiffening plate attached thereto, and wherein said fin has a plurality of "H" shaped slots such that the longitudinal axis of each slot is substantially colinear and the back flexure of one is the front flexure of the next slot, said axially colinear plurality of slots substantially dividing said fin into a plurality of substantially coextensive upper portions and substantially coextensive lower portions.

2. In a longitudinally movable voice coil actuator assembly, a fin with two sides, a front, and a back, in which said fin is substantially divided by a slot disposed longitudinally between said front and said back, said slot having enlarged ends, such that said slot forms the crosspiece and said ends form the uprights of a substantially "H" shaped hole through said fin and in which fin said slot substantially divides said fin into relatively immovable upper and lower portions and relatively movable front and back flexures wherein:

an area of said fin greater in size than said "H" shaped slot, is substantially covered by a layer of elastomeric material affixed to at least one of said fin sides, and wherein said elastomeric layer is substantially covered by stiffening plate attached thereto, and wherein said fin has a plurality of "H" shaped slots such that the longitudinal axis of each slot is substantially colinear and the back flexure of one is the front flexure of the next slot, said axially colinear plurality of slots substantially dividing said fin into a plurality of substantially coextensive upper portions and substantially coextensive lower portions.

3. A longitudinally movable body wherein said longitudinal movement is a result of energization of a coil wherein said longitudinally movable body comprises:

a central body, a fin member connecting said central body to said coil wherein said fin member has an "H"-shaped slot in the area of said fin member between said central body and said coil having two flexures each located between an upright of said "H" shaped slot and the end of the fin, an elastomer layer adhesively covering said slot, and stiffener means covering at least a portion of said elastomer layer and being spaced apart from said coil wherein said fin is measurable in length, height, and width, wherein the fin length divided by the fin height times the cube of the height of the flexure divided by the flexure thickness is approximately equal to ten.

* * * * *